May 18, 1937. B. JOHNSEN 2,080,485
SAFETY DEVICE
Original Filed March 5, 1932
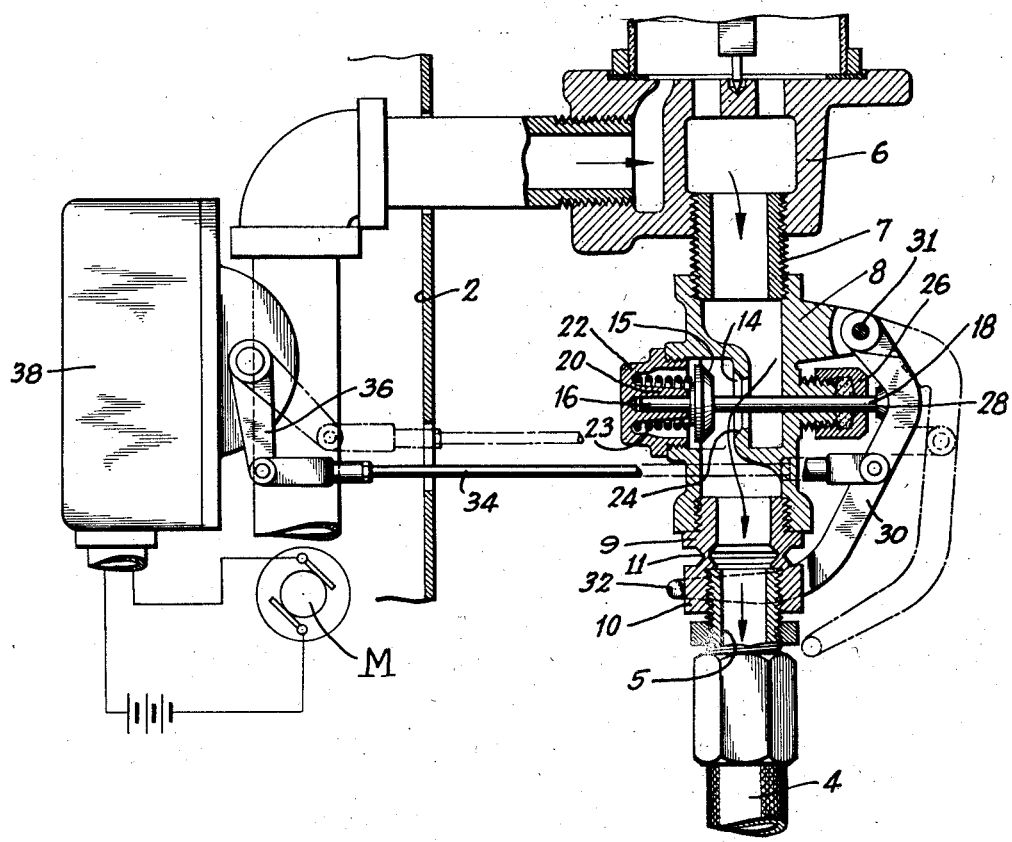
INVENTOR
BJORNULF JOHNSEN
BY
Frederick Griswold Jr.
ATTORNEY Patented May 18, 1937

2,080,485

UNITED STATES PATENT OFFICE 2,080,485

SAFETY DEVICE

Bjornulf Johnsen, Summit, N. J., assignor to Harry T. Goss and Bjornulf Johnsen, copartners trading as Goss & Johnsen, New York, N. Y.

Original application March 5, 1932, Serial No. 597,081. Divided and this application December 1, 1933, Serial No. 700,442

3 Claims. (Cl. 137—139)

This invention relates to the automatic control of fluid, either a liquid or a gas, flowing through a conduit, and more particularly to the interruption of such flow upon the disruption of the conduit by the application thereto of a load beyond that which it is designed to bear or heat above a predetermined temperature.

This application is a division of United States application Serial No. 597,081 filed March 5, 1932, and now Patent No. 2,048,387, issued July 21, 1936.

One object of the invention is to provide that, when a force is exerted on a hose or pipe, a fracture will occur at a predetermined point, which fracture shall automatically result in the closing of the conduit to the flow of fluid. Accordingly, the wall of the conduit is weakened at at least one predetermined point, and provision is made to instantaneously release a valve and permit it to close the conduit.

It is a further object of the invention to incorporate the valve and its associated controlling means, disruptable either by force or heat or both, in a self-contained unit adapted to be interposed in a fluid conduit at a desired point.

Yet another object of the invention is the provision of devices responsive to predetermined conditions which shall actuate or permit the actuation of any movable element, as for instance a valve, a circuit controlling device or a signalling device.

The invention further seeks, for the control of a member movable for any purpose whatsoever, an element responsive to a given set of conditions as, for instance, a force or heat applied thereto, which responsive element may, if desired, be replaceable.

The invention also seeks a device of the character described, which is practical from the standpoint of ease and cheapness of manufacture and convenience and reliability in installation and use.

In one of its aspects, the invention relates to a safety valve controlling, say, the flow of an inflammable liquid, such as gasoline delivered, say, through a hose to a vehicle tank from a fluid dispensing device such as is adapted to dispense gasoline and other liquid fuels at roadside service stations and the like, of the kind in which the pump is automatically actuated, as by a motor. In such fluid dispensing devices heretofore known, the operator, upon removing the nozzle from its support, starts the motor, for instance, by closing the motor circuit, manually or otherwise, and then moves to the vehicle tank where he can see exactly how much the tank will hold and serve it without spilling. If, while the fluid is being delivered, the vehicle should unexpectedly move off with the nozzle still inserted in the fuel tank, the hose may either be torn or broken or such a strain placed upon the fluid delivery device as to damage materially some or all of the parts thereof and, if a break occurred, inflammable fluid would flow out into the surrounding area and create a fire hazard.

In another of its aspects, the invention is applicable as a safety valve in a pipe line conducting illuminating gas, say, into or throughout a building, as at the meter in the service line from the gas main in the street. Or such a safety valve may be disposed on each floor or in each branch pipe line in a building. In any event, should damage to the line occur, the valve will automatically close the conduit.

The invention is equally applicable to the conduit conducting fuel oil to burners, say, on shipboard or in buildings, for the same purpose.

These and other objects of the invention and the means for their attainment will be more apparent from the following detailed description taken in connection with the accompanying drawing illustrating, partly in section, a valve adapted to close a conduit upon the breaking of the conduit at a predetermined point by the application of a load to the conduit and also showing the adaptation of the same breakable element to the opening of a switch in, say, a motor circuit.

While the invention has been illustrated as applied to a fluid dispensing device having a hose for delivery of fluid, it will be apparent, as the description proceeds, that the invention is not limited in its application to liquid dispensing devices having hoses for the delivery of liquid but that it is equally applicable in any situation in which the flow of any fluid, either liquid or gaseous, is to be controlled dependent upon the happening of an event, as a rupture in the conduit or associated or contiguous parts, and, if desired, the simultaneous actuation or control of a remote instrumentality.

In the application of the invention illustrated in the drawing, a housing 2 may be considered illustrative of a container for devices establishing the flow of fluid from a source and delivering it from a nozzle on the end of a hose 4 into, say, the fuel tank of a motor vehicle. The hose 4 is shown as leading from an outlet fitting 6 of any convenient kind.

It is proposed, in accordance with this invention, to provide a device indicated generally at 8 and 9—10 in the drawing, operatively inserted in a conduit section represented in the illustration by the nipple 7 and the nipple 5 on hose 4. Obviously the nipples 7 and 5 may represent the respective ends of any conduit sections. The device 8, 9—10 controls the flow of fluid through the conduit and interrupts its flow under certain conditions such as when there is a load or force applied to the conduit of such magnitude as to rupture it or displace or otherwise damage the conduit or any of its associated parts.

To the conduit portion 7 is secured a valve casing 8 having a valve opening 14 therein closed by a valve 15 mounted on a transversely extending valve stem 16, 18, one end 16 of which is seated in a bearing 20 formed in a removable member 22 threaded into one side of the casing 8 axially of the opening 14 and serving as a guide for a spring 23 bearing on the valve 15 and normally urging it against its seat 24 surrounding the valve opening 14.

The other end 18 of the valve stem on the other side of the valve 15 extends through a packing gland 26 and is conveniently formed at its outer end with a bearing surface 28 adapted to be engaged by a lever 30 pivoted at some convenient point, as at 31, on the valve casing 8. The lever 30 is irregular in shape and, in the embodiment illustrated, its end 32 is bent at an angle to engage one portion 10 of a responsive element, 9, 10, which, in the embodiment illustrated, is capable of fracture as at the weakened section 11 intermediate therebetween. The portion 9 is secured, say, to the valve casing 8 and the companion section 10 is secured to a conduit 5. Thus in the illustrated embodiment, if a sufficient pull is exerted on any portion of conduit 5 or sufficient force applied to it laterally, the responsive device 9, 10 will break at the point 11, freeing the end 32 of lever 30 and allowing the spring 23 to seat the valve 15 and thereby close the conduit.

The movement of the lever 30 may be utilized to permit the closing of the valve or, in the alternative thereof, to interrupt the motor circuit or perform some other function and to this end a link 34, secured to the lever 30 is shown as connected to a switch operating arm 36 of a switch, not shown, within the housing 38 and controlling the circuit of the motor M actuating a pump, say. Thus, if the responsive device is ruptured, as at 11, either a pull on the conduit or because the responsive device ruptures as a result of an increase in temperature, assuming the structure 9, 10 or a part thereof to be fusible at a predetermined temperature, the lever 30 will be released, allowing it to be moved by means of a spring, for instance, the spring 23, or any other spring urging the lever 30 to move to the dotted line position shown in the drawing, thereby drawing the link 34 to the dotted line position shown, thus effecting the desired movement, say, for opening the circuit to the motor and stopping the operation of the pump. It will be understood that the switch arm 36 is illustrative only and represents any remote instrumentality controlled by the responsive device 9, 10.

It will thus be seen that a safety valve or cutout valve or fire hazard valve has been provided which involves an element responsive to force or load and permits one element to move relative to another element to permit the actuation of a movable member as, for instance, to release a closure member, which movable member either closes an orifice through which fluid normally passes, or opens a pump circuit or performs some other movement. The strength of the material may be selected such as to stand the strain normally imposed thereon. It will be further observed that the responsive element or member capable of fracturing is readily removable and replaceable so that the same movable member, whether lever arm, valve or other device may be reused and only the member subject to destruction need be replaced.

While the invention has been described as combining the functions of closing a conduit and performing another operation at a remote point it will be obvious that the device is equally applicable when used solely to close the conduit or solely to actuate some remote instrumentality as well as to perform both functions substantially simultaneously.

Various modifications will occur to those skilled in the art in the composition, configuration and disposition of the component elements going to make up the invention as a whole as well as in the selection and combination of the individual elements hereinbefore described, and their use to perform a desired function, and no limitation is intended by the phraseology of the foregoing description or illustrations in the accompanying drawing, except as indicated in the appended claims.

What is claimed is:—

1. In a device of the character described, the combination with a conduit, of a valve casing insertable therein comprising a valve having a transversely extending valve stem extending without the casing and a seat therefor, a spring normally urging the valve to its seat, a tubular conduit portion in communication with said valve adapted to fracture upon the application of a given force and means positioned by said conduit portion adapted to engage the valve stem and retain it in valve open position and to be released upon fracture of the conduit portion.

2. In a device of the character described, the combination with a conduit, of a valve casing insertable therein comprising a valve having a transversely extending valve stem extending without the casing and a seat therefor, a spring normally urging the valve to its seat, a tubular conduit portion in communication with said valve subject to fracture upon the application of a given force and a lever pivoted on the valve casing positioned by said conduit portion and adapted to engage the valve stem and retain it in valve open position, said lever being released for movement to release said valve stem upon fracture of the conduit portion.

3. In a device of the character described, the combination with a conduit, of a valve casing insertable therein comprising a valve having a transversely extending valve stem extending without the casing and a seat therefor, a spring normally urging the valve to its seat, a tubular conduit portion in communication with said valve formed with a weakened portion and means releasably controlled by said conduit portion adapted to engage the valve stem and normally retain it in valve open position, said means being released by fracture of the conduit portion to release said valve stem for valve closing movement.

BJORNULF JOHNSEN.